United States Patent
Yamaguchi et al.

[11] Patent Number: 6,034,011
[45] Date of Patent: Mar. 7, 2000

[54] GLASS-CERAMIC SUBSTRATE FOR A MAGNETIC HEAD AND A METHOD FOR MANUFACTURING THE SAME

[75] Inventors: Katsuhiko Yamaguchi; Naoyuki Goto, both of Sagamihara, Japan

[73] Assignee: Kabushiki Kaisha Ohara, Japan

[21] Appl. No.: 09/266,559

[22] Filed: Mar. 11, 1999

Related U.S. Application Data

[62] Division of application No. 08/924,344, Sep. 5, 1997, abandoned.

[30] Foreign Application Priority Data

| Sep. 5, 1996 | [JP] | Japan | ................................. 8-255447 |
| Nov. 11, 1996 | [JP] | Japan | ................................. 8-327689 |
| Sep. 1, 1997 | [JP] | Japan | ................................. 9-251389 |

[51] Int. Cl.$^7$ ............................ C03C 10/04; C03C 10/14
[52] U.S. Cl. .................................. 501/4; 501/5; 501/63; 501/69; 501/72; 65/33.8; 216/89
[58] Field of Search ............................... 501/4, 5, 63, 69, 501/72; 65/33.8; 216/89

[56] References Cited

U.S. PATENT DOCUMENTS

| 5,336,643 | 8/1994 | Goto et al. | ................................. 501/7 |
| 5,391,522 | 2/1995 | Goto et al. | ................................. 501/4 |
| 5,567,217 | 10/1996 | Goto et al. | ................................. 501/7 |
| 5,580,363 | 12/1996 | Goto et al. | ................................. 501/4 |
| 5,591,682 | 1/1997 | Goto | ................................. 501/4 |
| 5,626,934 | 5/1997 | Goto et al. | ............................. 428/64.1 |
| 5,691,256 | 11/1997 | Taguchi et al. | ............................... 501/5 |
| 5,744,208 | 4/1998 | Beall et al. | ................................. 501/4 |
| 5,804,520 | 9/1998 | Morinaga et al. | ......................... 501/5 |
| 5,866,489 | 2/1999 | Yamaguchi | ................................ 501/4 |
| 5,868,953 | 2/1999 | Maekawa et al. | ......................... 501/4 |
| 5,872,069 | 2/1999 | Abe | ............................................ 501/4 |

*Primary Examiner*—Karl Group
*Attorney, Agent, or Firm*—Hedman, Gibson & Costigan, P.C.

[57] ABSTRACT

A glass-ceramic substrate for a magnetic head has as its predominant crystal phase a mixed crystal of lithium disilicate ($Li_2O \cdot 2SiO_2$) and either or both of α-quartz (α-$SiO_2$) and α-cristobalite (α-$SiO_2$), the α-quartz has a globular grain structure each globular crystal grain being made of aggregated particles and having a grain diameter within a range from 0.1 μm to 3.0 μm, the α-cristobalite has a globular grain structure each globular grain having a grain diamter within a range from 0.1 μm to 1.0 μm, and surface roughness (Ra) of the glass-ceramic substrate after polishing is within a range from 5 Å to 50 Å.

2 Claims, No Drawings

GLASS-CERAMIC SUBSTRATE FOR A MAGNETIC HEAD AND A METHOD FOR MANUFACTURING THE SAME

This is a divisional of application Ser. No. 08/924,344, filed Sep. 5, 1997, now abandoned.

BACKGROUND OF THE INVENTION

This invention relates to a glass-ceramic substrate for magnetic head having excellent machine processability and surface characteristics and having a good friction characteristic with respect to a magnetic disk, and a method for manufacturing the glass-ceramic substrate.

Recent development of multimedia technology has resulted in processing of a large volume of data for image and voice. To cope with this situation, a rapid progress has been made for changing an HDD (hard disk) device which is a main external recording medium of a computer to one of a larger capacity and a higher speed. Keeping pace with this tendency, an inductive type thin film magnetic head is being replaced by a magneto-resistive head (MR head) in the field of a thin film magnetic head. Further, as a future type of magnetic head, a giant magneto-resistive head (GMR head) has become an object of attention.

In operation, the current hard disk device rotates a hard disk at a high speed and performs writing on and reading from the hard disk by means of a magnetic head which in operation is not in contact with the surface of the hard disk. In a hard disk device employing a CSS (contact start and stop) system, in order to prevent sticking of the magnetic head slider to the magnetic disk, a processing (mechanical texturing) is performed according to which a mechanical grinding is made for leaving substantially concentric circumferential machining traces on a magnetic disk substrate. There are also performed alternative texturing processings on a magnetic disk such as an etching processing, a sputtering processing and a laser processing. It is also proposed to produce crystal grains having a special crystal structure on the surface of a disk substrate and thereby obviate the above mentioned texturing processings. As to a magnetic head, the following proposals have been made for coping with the problem relating to the CSS system.

Japanese Patent Application Laid-open No. Sho 56-169264 proposes a magnetic head in which a non-contact type film is formed on a slider surface which opposes the surface of a magnetic medium for preventing sticking of the slider. Japanese Patent Application Laid-open No. Hei 5-182189 proposes a method for preventing sticking by forming a photo-sensitive glass layer on a rail portion of a magnetic head which contacts the surface of a magnetic disk substrate and forming a pat tern of projections and depressions on the surface of this photo-sensitive glass layer. Japanese Patent Application Laid-open No. Sho 63-60127 discloses high strength and high thermal expansion glass-ceramics for a magnetic head substrate having α-quartz and spinel as its predominant crystal phase.

However, in the magnetic head having a non-contact type film, powder produced as a result of wear of the film is liable to cause difficulty in the sliding movement in case the film is made of a solid material while, in case the film is made of a liquid material, it is liable to cause wear and stripping off due to wear and resulting sticking to the slider with resulting decrease in efficiency.

In the magnetic head using the photo-sensitive glass, there is a problem of stripping off of the glass layer from the magnetic head. Besides, the photo-sensitive processing or etching processing must be made for forming the pattern of projections and depressions which is labor-consuming and costly. The glass-ceramics having α-quartz and spinel as its crystal phase has a high strength but its processability is poor. There is also a magnetic head material which uses an alumina-titanium-carbide sintered material but this material is very hard and its processability is poor. Moreover, this material has many voids and this reduces productivity and make it difficult to manufacture the magnetic head with this material at a low cost.

It is an object of the present invention to eliminate the above described defects of the prior art and provide a glass-ceramic substrate for a magnetic head having excellent surface characteristics and a method for manufacturing the same by controlling the crystal structure and crystal grains of the crystal grown in the glass-ceramics.

SUMMARY OF THE INVENTION

Accumulated studies and experiments made by the inventors of the present invention for achieving the above described object of the invention have resulted in the fining, which has led to the present invention, that a glass-ceramic obtained by subjecting to heat treatment, under specific heating conditions, a base glass of $SiO_2$—$Li_2O$ —$P_2O_5$ system has a mixed crystal structure in which either or both of globular crystal grains of α-quartz (α-$SiO_2$) each consisting of aggregated particles and globular grains of α-cristobalite have randomly grown in a fine crystal of lithium disilicate ($Li_2O$. $2SiO_2$) and that differences in mechanical and chemical actions caused by the polishing processing between the lithium disilicate crystal phase which is mechanically and chemically instable and the aggregated globular grains of α-quartz or globular grains of α-cristobalite which is mechanically and chemically stable cause projections and depressions to be produced on the surface, and further that, by controlling the size of either or both of the aggregated globular grains of α-quartz and the globular grains of α-cristobalite, a material having excellent surface characteristics after polishing as the magnetic head substrate can be obtained.

For achieving the above described object of the invention, a glass-ceramic substrate for a magnetic head is characterized in that said glass-ceramic substrate has as its predominant crystal phase a mixed crystal of lithium disilicate ($Li_2O$. $2SiO_2$ ) and either or both of α-quartz (α-$SiO_2$) and α-cristobalite (α-$SiO_2$), said α-quartz has a globular grain structure each globular crystal grain being made of aggregated particles and having a grain diameter within a range from 0.1 μm to 3.0 μm, said α-cristobalite has a globular grain structure each globular grain having a grain diamter within a range from 0.1 μm to 1.0 μm, and surface roughness (Ra) of said glass-ceramic substrate after polishing is within a range from 5 Å to 50 Å.

In one aspect of the invent ion, the glass-ceramic substrate for a magnetic head is characterized in that said glass-ceramic substrate is obtained by subjecting to heat treatment a base glass comprising in weight percent:

| | |
|---|---|
| $SiO_2$ | 65–83% |
| $Li_2O$ | 8–13% |
| $K_2O$ | 0–7% |
| MgO + ZnO + PbO | 0.5–5.5% |
| in which MgO | 0.5–5.5% |
| ZnO | 0–5% |

-continued

| | |
|---|---|
| PbO | 0–5% |
| $P_2O_5$ | 1–3% |
| $Al_2O_3$ | 0–7% |
| $As_2O_3 + Sb_2O_3$ | 0–2% | and thereafter polishing the surface of the substrate to surface roughness (Ra) of 5 Å to 50 Å.

In another aspect of the invention, the glass-ceramic substrate for a magnetic head is characterized in that said glass-ceramic substrate is obtained by subjecting to heat treatment a base glass comprising in weight percent:

| | |
|---|---|
| $SiO_2$ | 70–82% |
| $Li_2O$ | 8–12% |
| $K_2O$ | 1–6% |
| MgO + ZnO | 1.5–5.5% |
| in which MgO | 1–5% |
| ZnO | 0.2–5% |
| $P_2O_5$ | 1–3% |
| $Al_2O_3$ | 1–6% |
| $As_2O_3 + Sb_2O_3$ | 0–2%. | and thereafter polishing the surface of the substrate to surface roughness (Ra) of 5 Å to 50 Å.

In another aspect of the invention, there is provided a method for manufacturing a glass-ceramic substrate for a magnetic head characterized by subjecting to heat treatment a base glass comprising in weight percent:

| | |
|---|---|
| $SiO_2$ | 65–83% |
| $Li_2O$ | 8–13% |
| $K_2O$ | 0–7% |
| MgO + ZnO + PbO | 0.5–5.5% |
| in which MgO | 0.5–5.5% |
| ZnO | 0–5% |
| PbO | 0–5% |
| $P_2O_5$ | 1–4% |
| $Al_2O_3$ | 0–7% |
| $As_2O_3 + Sb_2O_3$ | 0–2% | at a nucleus forming temperature within a range from 400° C. to 600° C. for 1 to 10 hours and further subjecting the glass to heat treatment at a crystallization temperature within a range from 650° C. to 850° C. for one to ten hours, and thereafter polishing the surface of the substrate to surface roughness (Ra) of 5 Å to 50 Å.

In still another aspect of the invention, there is provided a method for manufacturing a glass-ceramic substrate for a magnetic head characterized by subjecting to heat treatment a base glass comprising in weight percent:

| | |
|---|---|
| $SiO_2$ | 70–82% |
| $Li_2O$ | 8–12% |
| $K_2O$ | 1–6% |
| MgO + ZnO | 1.5–5.5% |
| in which MgO | 1–5% |
| ZnO | 0.2–5% |
| $P_2O_5$ | 1–3% |
| $Al_2O_3$ | 1–6% |
| $As_2O_3 + Sb_2O_3$ | 0–2% | at a nucleus forming temperature within a range from 450° C. to 540° C. for one to five hours and further subjecting the glass to heat treatment at a crystallization temperature within a range from 730° C. to 820° C. for one to five hours and thereafter polishing the surface of the substrate to surface roughness (Ra) of 5 Å to 50 Å.

According to the invention, the glass-ceramic substrate has as its predominant crystal phase a mixed crystal of lithium disilicate ($Li_2O \cdot 2SiO_2$) and either or both of α-quartz (α-$SiO_2$) and α-cristobalite (α-$SiO_2$), the α-quartz has a globular grain structure each globular crystal grain being made of aggregated particles and having a grain diameter within a range from 0.1 μm to 3.0 μm, the α-cristobalite has a globular grain structure each globular grain having a grain diamter within a range from 0.1 μm to 1.0 μm, and surface roughness (Ra) of the glass-ceramic substrate after polishing is within a range from 5 Å to 50 Å whereby the invention can provide a magnetic head substrate having a surface rougness which does not need the laser texturing or mechanical or chemical textureing which has been required in the prior art magnetic head substrates for improving the CSS characteristics of the magnetic disk device.

Further, since the surface roughness within the above described range can be easily obtained by simply changing the conditions of heat treatment, the substrate can be adapted for use with magnetic disk substrates having a variety of surface roughnesses. Furthermore, the substrate surface has a fine crystal structure having no surface defect such as a pit or void. Therefore, a magnetic head substrate having characteristics suited for the high recording density magnetic disk device can be manufactured at a tow cost and in a large scale on a stable basis.

In the glass-ceramic substrate for a magnetic head according to the invention, it is essential from the standpoint of tribology between the magnetic head and the magnetic disk that the glass-ceramic substrate has as its predominant crystal phase a mixed crystal of lithium disilicate ($Li_2O \cdot 2SiO_2$) and either or both of α-quartz (α-$SiO_2$) and α-cristobalite (α-$SiO_0$), said α-quartz has a globular grain structure each globular crystal grain being made of aggregated particles and having a grain diameter within a range from 0.1 μm to 3.0 μm, said α-cristobalite has a globular grain structure each globular grain having a grain diameter within a range from 0.1 μm to 1.0 μm, and surface roughness (Ra) of said glass-ceramic substrate after polishing is within a range from 5 Å to 50 Å.

Preferably, the size of the aggregated globular grain of α-quartz should be 0.1 μm–2.0 μm, the size of the globular grain of α-cristobalite should be 0.1 μm–0.8 μm and the surface roughness after polishing should be 5 Å–40 Å. More preferably, the size of the aggregated globular grain of α-quartz should be 0.1 μm–1.5 μm, the size of the globular grain of α-cristobalite should be 0.1 μm–0.6 μm and the surface roughness after polishing should be 5 Å–30 Å.

DETAILED DESCRIPTION OF THE INVENTION

The composition of the glass-ceramic substrate of the invention is expressed on the basis of composition of oxides as in its base glass. The above described content ranges of the respective ingredients have been selected for the reasons stated below.

The $SiO_2$ ingredient is a very important ingredient which produces lithium disilicate ($Li_2O \cdot 2SiO_2$), α-quartz (α-$SiO_2$) and α-cristobalite crystal as a predominant crystal phase when the base glass is subjected to heat treatment, if the amount of this ingredient is below 65%. the crystal produced in the glass-ceramic is instable and its texture tends to become too rough. If the amount of this ingredient exceeds 83%, difficulty arises in melting and forming the base glass. As a result of experiments, it has been found that a preferable range is 70–82% and a more preferable range is 70–77%.

The $Li_2$ ingredient is also an important ingredient which produces lithium disilicate ($Li_2O \cdot 2SiO_2$) crystal as a predominant crystal phase by heat treating the base glass. If the amount of this ingredient is below 8%, difficulty arises in growing of this crystal and also in melting of the base glass. If the amount of this ingredient exceeds 13%, texture of the grown crystal of the glass-ceramic tends to become too rough and besides, chemical durability and hardness of this glass-ceramic are deteriorated. A preferable range is 8–12% and a more preferable range is 8–11%.

The $K_2O$ ingredient improves melting property of the base glass and prevents crystal grains from becoming too rough. If the amount of this ingredient exceeds 7%. the grown crystal becomes too rough, the crystal phase undergoes change and chemical curability is deteriorated so that the amount should be 7% or below. A preferable range is 1–6% and a more preferable range is 1–5%.

The divalent metal oxides MgO, ZnO and PbO are important ingredients which cause crystal grains of α-quartz (α-$SiO_2$) to grow randomly as a predominant crystal phase in the glass-ceramic of the invention in the form of globular grains each consisting of aggregated particles. As a result of experiments, it has been found that, in order to cause a desired crystal to grow, it is necessary to add the MgO ingredient in a range from 0.5–5.5% and the ZnO and PbO ingredients may be added up to 5% respectively for assisting adjustment of growth of the crystal. If the total amount of these three ingredients is below 0.5%, a desired grain diameter cannot be obtained whereas if the total amount of these three ingredients exceeds 5.5%, difficulty arises in obtaining a desired crystal. A preferable range is 1–5% for MgO, 0.2–5% for ZnO and 1.5–5.5% for MgO+ZnO. A more preferable range is 2–4% for MgO, 0.5–4% for ZnO and 2.5–5.5% for MgO+ZnO.

The $P_2O_5$ ingredient is an essential ingredient as a nucleating agent for the glass-ceramic. If the amount of this ingredient is below 1%, sufficient forming of nucleus cannot be attained. If the amount of this ingredient exceeds 4%, the crystal grown of the glass-ceramic becomes instable and it s texture becomes too rough and, moreover, devitrification tends to occur during melting of the base glass. A preferable range is 1–3% and a more preferable range is 1.5–2.5%.

The $Al_2O_3$ ingredient is effective for improving chemical durability of the glass-ceramic. If the amount of this ingredient exceeds 7%, the melting property of the glass is deteriorated and the amount of precipitation of α-quartz as a predominant crystal phase is reduced. A preferable range is 1–6%.

The $As_2O_3$ and $Sb_2O_3$ ingredients may be added as refining agents in melting of the base glass. It will suffice if each ingredient up to 2% is added.

In addition to the above described ingredients, a small amount of $B_2O_3$, CaO, SrO, BaO, $TiO_2$, $SnO_2$ and $ZrO_2$ may be added for adjusting the diameter of grown crystal grains within a range not impairing the desired characteristics of the glass-ceramics.

For manufacturing the glass-ceramic substrate for a magnetic head of the invention from the base glass having the above described composition, the base glass having the above described composition is melted and is subjected to heat forming or cold forming and, thereafter, is heat treated for forming a crystal nucleus at a temperature within a range from 400° C. to 600° C. and further heat treated for crystallization at a temperature within a range from 650° C. to 850° C. and the glass-ceramic substrate can be easily obtained. If the nucleating temperature is below 400° C., forming of nucleus by phase-separation of $P_2O_5$ ingredient becomes insufficient whereas if the nucleating temperature exceeds 600° C., a uniform forming of crystal nucleus of fine crystal of lithium disilicate cannot be achieved and, moreover, the crystal nucleus becomes too rough. As a result, the aggregated globular grains of α-quartz (α-$SiO_2$) which precipitate subsequently tend to become dispersed and become single crystal grains of α-quartz and crystal grains of α-cristobalite having an abnormal diameter tend to be produced.

The crystallization temperature is as important as the effect of addition of the divalent metal oxides including MgO ingredient for controlling the α-quartz crystal to the globular grains of aggregated particles and controlling the α-cristobalite crystal to the globular grains. If the crystallization temperature is below 650° C., difficulty arises in aggregating of fine particles of the α-quartz crystal into the globular grain structure. If the crystallization temperature exceeds 850° C., it becomes difficult to maintain the globular grain structure of aggregated particles of α-quartz and also the globular grain structure of α-cristobalite. For obtaining the best surface roughness as the magnetic head substrate, the base glass should preferably be heat treated at the nucleating temperature within a range from 450° C. to 540° C. for one to five hours and further heat treated at the crystallization temperature within a range from 730° C. to 820° C. for one to five hours.

The glass-ceramic obtained by the above described heat treatment is subjected to conventional lapping and polishing processes and thereby a glass-ceramic substrate for a magnetic head having a surface roughness (Ra) within a range from 5 Å to 50 Å is provided.

EXAMPLES

Tables 1–6 show results of measurements of crystal phase and surface roughness (Ra) after polishing of glass-ceramics of the invention which were manufactured from base glasses having compositions of Examples Nos. 1–22 and Comparative Examples 1 and 2 under the conditions described in the tables (i.e., nucleation temperature, crystallization temperature and processing hour). In the tables, numerical values of respective ingredients are expressed in weight percent, α-quartz is indicated as "α-Q" and α-cristobalite as "α-C" respectively.

TABLE 1

| Example No. | 1 | 2 | 3 | 4 |
|---|---|---|---|---|
| $SiO_2$ | 69.0 | 73.0 | 76.7 | 75.5 |
| $Li_2O$ | 9.0 | 8.0 | 10.0 | 10.0 |
| $Al_2O_3$ | 5.0 | 5.0 | 3.8 | 4.0 |
| MgO | 3.5 | 4.0 | 3.0 | 1.5 |
| ZnO | 0.5 | 0.5 | 0.5 | |
| PbO | 0.5 | | | 2.0 |
| $K_2O$ | 7.0 | 4.0 | 3.5 | 4.5 |
| $P_2O_5$ | 1.5 | 4.0 | 2.0 | 2.0 |
| $As_2O_3$ | 0.5 | 0.5 | 0.5 | 0.5 |
| $Sb_2O_3$ | | | | |
| others | BaO:1.5 $ZrO_2$:1.0 | SrO:1.0 | | |
| nucleation temperature (° C.) | 450 | 540 | 480 | 500 |

TABLE 1-continued

| Example No. | 1 | 2 | 3 | 4 |
|---|---|---|---|---|
| nucleation time (hr) | 2 | 5 | 5 | 1 |
| crystallization temperature (°C.) | 760 | 780 | 750 | 750 |
| crystallization time (hr) | 3 | 3 | 8 | 2 |
| predominant crystal phase | α-Q (globular) $Li_2O.2SiO_2$ | α-Q (globular) $Li_2O.2SiO_2$ | α-Q (globular) $Li_2O.2SiO_2$ | α-Q (globular) $Li_2O.2SiO_2$ |
| grain diameter (μm) | 0.6 | 1.3 | 1.2 | 0.7 |
| surface roughness Ra (Å) | 15 | 35 | 32 | 18 |

TABLE 2

| Example No. | 5 | 6 | 7 | 8 |
|---|---|---|---|---|
| $SiO_2$ | 76.0 | 76.5 | 77.5 | 82.0 |
| $Li_2O$ | 10.5 | 11.0 | 9.0 | 11.0 |
| $Al_2O_3$ | 4.0 | 3.0 | 2.0 | 1.5 |
| MgO | 2.5 | 1.0 | 2.5 | 1.0 |
| ZnO | 0.5 | 2.0 | 1.0 | |
| PbO | | | 1.0 | |
| $K_2O$ | 4.0 | 4.0 | 5.0 | 2.3 |
| $P_2O_5$ | 2.0 | 2.0 | 1.5 | 1.7 |
| $As_2O_3$ | 0.5 | 0.5 | 0.5 | 0.5 |
| $Sb_2O_3$ | | | | |
| others | | | | |
| nucleation temperature (°C.) | 500 | 540 | 500 | 540 |
| nucleation time (hr) | 5 | 5 | 5 | 5 |
| crystallization temperature (°C.) | 780 | 780 | 730 | 820 |
| crystallization time (hr) | 2 | 5 | 2 | 5 |
| predominant crystal phase | α-Q (globular) $Li_2O.2SiO_2$ | α-Q (globular) $Li_2O.2SiO_2$ | α-Q (globular) $Li_2O.2SiO_2$ | α-Q (globular) $Li_2O.2SiO_2$ |
| grain diameter (μm) | 1.2 | 1.5 | 0.5 | 1.3 |
| surface roughness Ra (Å) | 30 | 40 | 12 | 33 |

TABLE 3

| Example No. | 9 | 10 | 11 | 12 |
|---|---|---|---|---|
| $SiO_2$ | 76.7 | 75.0 | 67.5 | 69.3 |
| $Li_2O$ | 10.5 | 11.0 | 10.0 | 9.0 |
| $Al_2O_3$ | 3.5 | 3.8 | 6.0 | 5.0 |
| MgO | 2.8 | 3.0 | 2.5 | 3.5 |
| ZnO | 0.5 | 1.0 | 1.0 | 0.5 |
| PbO | | | 1.5 | 1.5 |
| $K_2O$ | 4.0 | 4.5 | 6.0 | 7.0 |
| $P_2O_5$ | 2.0 | 2.0 | 2.0 | 1.5 |
| $As_2O_3$ | | 0.5 | 0.5 | 0.5 |
| $Sb_2O_3$ | 0.5 | | | |
| others | | | CaO:1.0 $B_2O_3$:2.0 | BaO:1.5 $ZrO_2$:1.0 |
| nucleation temperature (°C.) | 540 | 540 | 480 | 510 |
| nucleation time (hr) | 5 | 5 | 3 | 1 |
| crystallization temperature (°C.) | 780 | 760 | 750 | 750 |

TABLE 3-continued

| Example No. | 9 | 10 | 11 | 12 |
|---|---|---|---|---|
| crystallization time (hr) | 2 | 2 | 2 | 3 |
| predominant crystal phase | α-Q (globular) $Li_2O.2SiO_2$ | α-Q (globular) $Li_2O.2SiO_2$ | α-Q (globular) $Li_2O.2SiO_2$ | α-Q (globular) $Li_2O.2SiO_2$ |
| grain diameter (μm) | 0.8 | 0.9 | 0.7 | 0.6 |
| surface roughness Ra (Å) | 20 | 22 | 16 | 15 |

TABLE 4

| Example No. | 13 | 14 | 15 | 16 |
|---|---|---|---|---|
| $SiO_2$ | 69.5 | 73.0 | 74.0 | 75.5 |
| $Li_2O$ | 9.0 | 8.0 | 12.5 | 10.0 |
| $Al_2O_3$ | 5.5 | 5.0 | 4.5 | 4.5 |
| MgO | 1.0 | 4.0 | 2.0 | 1.0 |
| ZnO | 0.5 | 0.5 | | |
| PbO | 4.0 | | 2.0 | 2.0 |
| $K_2O$ | 6.0 | 4.0 | | 4.5 |
| $P_2O_5$ | 2.0 | 4.0 | 2.5 | 2.0 |
| $As_2O_3$ | | 0.5 | 0.5 | 0.5 |
| $Sb_2O_3$ | 0.5 | | | |
| others | $TiO_2$:2.0 | SrO:1.0 | $SnO_2$:2.0 | |
| nucleation temperature (°C.) | 470 | 530 | 500 | 430 |
| nucleation time (hr) | 6 | 3 | 4 | 8 |
| crystallization temperature (°C.) | 770 | 780 | 780 | 750 |
| crystallization time (hr) | 2 | 3 | 3 | 2 |
| predominant crystal phase | α-Q (globular) $Li_2O.2SiO_2$ | α-Q (globular) $Li_2O.2SiO_2$ | α-Q (globular) $Li_2O.2SiO_2$ | α-Q (globular) $Li_2O.2SiO_2$ |
| grain diameter (μm) | 0.7 | 1.3 | 1.5 | 0.8 |
| surface roughness Ra (Å) | 18 | 35 | 42 | 18 |

TABLE 5

| Example No. | 17 | 18 | 19 | 20 |
|---|---|---|---|---|
| $SiO_2$ | 76.0 | 76.5 | 78.5 | 82.3 |
| $Li_2O$ | 10.5 | 10.5 | 9.0 | 12.0 |
| $Al_2O_3$ | 4.0 | 3.5 | 2.0 | |
| MgO | 2.5 | 1.0 | 2.5 | 1.0 |
| ZnO | 0.5 | 2.0 | 1.0 | |
| PbO | | | 1.0 | |
| $K_2O$ | 4.0 | 4.0 | 4.0 | 2.5 |
| $P_2O_5$ | 2.0 | 2.0 | 1.5 | 1.7 |
| $As_2O_3$ | 0.5 | 0.5 | 0.5 | 0.5 |
| $Sb_2O_3$ | | | | |
| others | | | | |
| nucleation temperature (°C.) | 470 | 580 | 520 | 450 |
| nucleation time (hr) | 4 | 2 | 4 | 3 |
| crystallization temperature (°C.) | 780 | 780 | 780 | 820 |
| crystallization time (hr) | 2 | 5 | 2 | 2 |
| predominant crystal phase | α-Q (globular) $Li_2O.2SiO_2$ | α-Q (globular) $Li_2O.2SiO_2$ | α-Q (globular) $Li_2O.2SiO_2$ | α-Q (globular) $Li_2O.2SiO_2$ |
| grain diameter (μm) | 1.2 | 1.5 | 1.4 | 1.0 |

TABLE 5-continued

| Example No. | 17 | 18 | 19 | 20 |
|---|---|---|---|---|
| surface roughness Ra (Å) | 30 | 40 | 36 | 20 |

TABLE 6

| Example No. | 21 | 22 | Comparative Example 1 | Comparative Example 2 |
|---|---|---|---|---|
| $SiO_2$ | 76.5 | 76.5 | 56.0 | 71.0 |
| $Li_2O$ | 10.5 | 10.0 |  | 12.0 |
| $Al_2O_3$ | 3.5 | 3.5 | 22.5 | 9.6 |
| MgO | 0.8 | 1.3 | 10.5 |  |
| ZnO | 0.5 | 0.5 |  |  |
| PbO |  |  |  | 0.9 |
| $K_2O$ | 3.8 | 3.8 |  |  |
| $P_2O_5$ | 2.3 | 2.3 |  | 1.9 |
| $As_2O_3$ |  |  | 0.5 |  |
| $Sb_2O_3$ | 0.2 | 0.2 |  | 0.2 |
| others | $ZrO_2$:1.9 | $ZrO_2$:1.9 | $TiO_2$:6.5 $ZrO_2$:2.5 BaO:1.5 | $Na_2O$:3.8 CaO:0.4 SrO:0.4 |
| nucleation temperature (° C.) | 540 | 530 | 820 | 600 |
| nucleation time (hr) | 3 | 2 | 0.5 | 3 |
| crystallization temperature (° C.) | 760 | 740 | 1020 | 840 |
| crystallization time (hr) | 2 | 1 | 8 | 2 |
| predominant crystal phase grain diameter (μm) | α-C (globular) 0.3 $Li_2O.2SiO_2$ | α-Q (globular) 0.3 α-C (globular) 0.1 $Li_2O.2SiO_2$ | α-Q (globular) spinel | α-Q 3.5 $Li_2O.2SiO_2$ |
| surface roughness Ra (Å) | 5 | 5 | 53 | 65 |

For manufacturing the glass-ceramic substrate for magnetic head of the above described examples, materials including oxides, carbonates and nitrates are mixed and molten in a conventional melting apparatus at a temperature within a range from about 1350° C. to about 1500° C. The molten glass is stirred to homogenize it and thereafter formed to a desired shape and annealed to provide a formed glass. Then, this formed glass is subjected to heat treatment (nucleating and crystallizing processes) at a predetermined temperature and for a predetermined hour to provide a desired glass-ceramic. The glass-ceramic is then subjected to lapping with GC lapping grains and finally polished for about 30 minutes to 40 minutes with cerium oxide having average grain diameter ranging from 9 μm to 12 μm. The surface roughness (Ra) was measured with a surface roughness meter (Tencor P2) and identification of the grown crystal was made with an X-ray diffraction apparatus.

As shown in the Examples, in the glass-ceramic for a magnetic head according to the invention, a desired surface roughness can be obtained by causing either or both of globular grains of α-quartz each consisting of aggregated particles and globular grains of α-cristobalite to randomly grow in the fine crystal of lithium disilicate ($Li_2O.2SiO_2$) On the other hand, in the glass-ceramic substrate of Comparative Example 1 in which the grown crystal phases are α-quartz and spinel, a desired surface roughness cannot be achieved. Moreover, since the crystallization temperature and the nucleating temperature are much higher than those of the present invention, the glass-ceramic of Comparative Example 1 has only a poor productivity In the glass-ceramic substrate of Comparative Example 2 in which the grown crystal phases are α-quartz and lithium disilicate, the grain diameter of the grown crystal is too large to provide a desired surface roughness.

We claim:

1. A method for manufacturing a glass-ceramic substrate for a magnetic head, said glass-ceramic substrate having as its predominant crystal phase a mixed crystal of lithium disilicate ($Li_2O.2SiO_2$) and either or both of α-quartz (α-$SiO_2$) and α-cristobalite (α-$SiO_2$), said α-quartz having a globular grain structure each globular crystal grain being made of aggregated particles and having a grain diameter within a range from 0.1 μm to 3.0 μm, said α-cristobalite having a globular grain structure each globular grain having a grain diameter within a range from 0.1 μm to 1.0 μm, said method comprising steps of subjecting to heat treatment a base glass comprising in weight percent:

| | |
|---|---|
| $SiO_2$ | 65–83% |
| $Li_2O$ | 8–13% |
| $K_2O$ | 0–7% |
| MgO + ZnO + PbO | 0.5–5.5% |
| in which MgO | 0.5–5.5% |
| ZnO | 0–5% |
| PbO | 0–5% |
| $P_2O_5$ | 1–4% |
| $Al_2O_3$ | 0–7% |
| $As_2O_3 + Sb_2O_3$ | 0–2% | at a nucleus forming temperature within a range from 400° C. to 600° C. for one to ten hours and further subjecting the glass to heat treatment at a crystallization temperature within a range from 650° C. to 820° C. for one to ten hours, and thereafter polishing the surface of the substrate to a surface roughness (Ra) of 5 Å to 50 Å.

2. A method for manufacturing a glass-ceramic substrate for a magnetic head, said glass-ceramic substrate having as its predominant crystal phase a mixed crystal of lithium disilicate ($Li_2O.2SiO_2$) and either or both of α-quartz (α-$SiO_2$) and α-cristobalite (α-$SiO_2$), said α-guartz having a globular grain structure each globular crystal grain being made of aggregated particles and having a grain diameter within a range from 0.1 μm to 3.0 μm, said α-cristobalite having a globular grain structure each globular grain having a grain diameter within a range from 0.1 μm to 1.0 μm, said method comprising steps of subjecting to heat treatment a base glass comprising in weight percent:

| | |
|---|---|
| $SiO_2$ | 70–82% |
| $Li_2O$ | 8–12% |
| $K_2O$ | 1–6% |
| MgO + ZnO | 1.5–5.5% |
| in which MgO | 1–5% |
| ZnO | 0.2–5% |
| $P_2O_5$ | 1–3% |
| $Al_2O_3$ | 1–6% |
| $As_2O_3 + Sb_2O_3$ | 0–2% | at a nucleus forming temperature within a range from 450° C. to 540° C. for one to five hours and further subjecting the glass to heat treatment at a crystallization temperature within a range from 730° C. to 820° C. for one to five hours and thereafter polishing the surface of the substrate to a surface roughness (Ra) of 5 Å to 50 Å.

* * * * *